(No Model.)
J. W. FULLER.
CAR WHEEL.
No. 597,540.　　　　　　　　Patented Jan. 18, 1898.
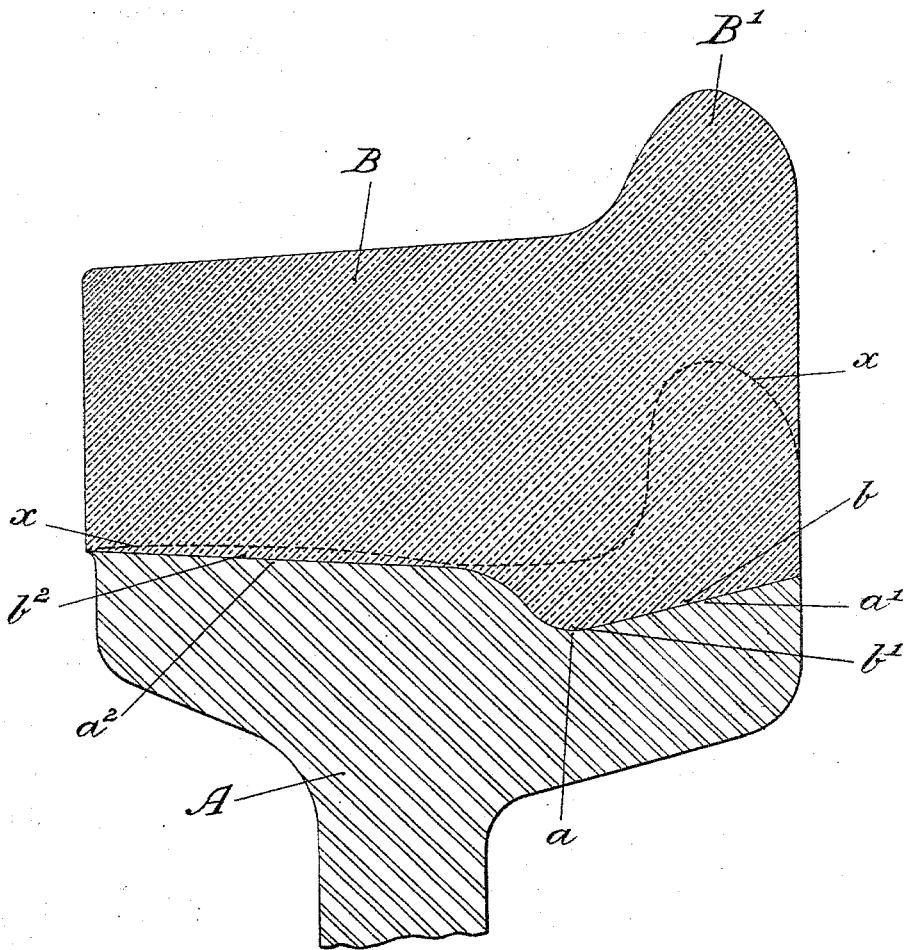
Witnesses:
Thomas M. Smith.
Richard C. Maxwell.
Inventor:
James W. Fuller,
By J. Walter Douglass,
Attorney.
THE NORRIS PETERS CO., PHOTO-LITHO., WASHINGTON, D. C.

UNITED STATES PATENT OFFICE.

JAMES W. FULLER, OF CATASAUQUA, PENNSYLVANIA.

CAR-WHEEL.

SPECIFICATION forming part of Letters Patent No. 597,540, dated January 18, 1898.

Application filed October 29, 1897. Serial No. 656,741. (No model.)

*To all whom it may concern:*

Be it known that I, JAMES W. FULLER, a citizen of the United States, residing at Catasauqua, in the county of Lehigh and State of Pennsylvania, have invented certain new and useful Improvements in Car-Wheels, of which the following is a specification.

My invention has relation to the manufacture of a car-wheel of the type designated as a "steel-tire-welded" wheel, and in such connection it relates particularly to the shape or form of the tire welded to the body of the wheel, so as to be without fracture or air-holes or other features calculated to weaken at the point of union of the tire with the body of the wheel, and especially that portion adjacent to the flange or rim subject to the greatest strain, insuring thereby maximum strength and service of the wheel, as well as safety to the end of the life of the tire of the wheel.

Hitherto car-wheels have been constructed in a variety of ways—for example, first, with a locking section; second, with a non-locking section, and, third, with an interlocking section. The first or locking sectional wheel may be described as one having a tire provided with inwardly-projecting ribs or side flanges with a cast-iron body fused or welded thereto; but such a wheel possesses disadvantageous features in that if the steel tire is entirely worn through to the iron under the tread the flange is liable to break off at the point of union of the one with the other. The second or the non-locking sectional wheel may be described as one which is generally slightly concaved about the center of the inner periphery of the same and therefrom on both sides of the center, merging into flat walls; but the objection thereto is that there is no locking between the steel rim or tire and cast-iron body, and in the event of imperfect weld fracture or cracking of the tire in cross-section is very apt to occur, because there is nothing to hold it to prevent breaking or flying off from the center. Moreover, the safety of the flange is endangered when substantially the tread portion is worn out, only in such instance the seam or weld between the tire and the body is horizontal instead of vertical. The third or interlocking sectional wheel presents a difficulty, as practice has demonstrated, in that it is next to impossible to secure a perfect weld, and this arises from the pouring, in that air-holes will be formed in spite of the exercise of great care and even under the most expert handling of the elements of such a composite-wheel.

The principal object of my present invention is to provide an inexpensive wheel, by reason of the great saving of scrap in the making of the same, and a very durable and efficient steel-tire-welded car-wheel, because without air-holes where the tire is fused or welded to the body of the wheel, and especially about that portion adjacent to the flange or rim calculated to weaken the wheel, interfering relatively with the mileage service thereof, as well as making an unreliable and expensive wheel in that its duration for usefulness or service is appreciably lessened.

My invention consists of a steel-tire-welded car-wheel when constructed and arranged as hereinafter described and claimed, taken in connection with the accompanying drawing, illustrating in cross-section a car-wheel embodying the particular or essential features of my said invention.

Referring to the drawing, A represents the body of the wheel, composed, preferably, of cast-iron.

B is the tire, and B' is the flange, both composed of steel or other suitable material. The tire is provided with a rear inclined wall $b$, merging into a convex-concave offset $b'$, which in turn merges into an oppositely inclined or tapering wall $b^2$. The tire with its flange is fused or welded to the body A of the wheel, provided in the front edge or wall with a recess $a$, complemental to the offset $b'$ of the tire, and with inclined walls or edges $a'$ and $a^2$, in which by fusion the tire B, with its flange B', is welded to the body A of the wheel. A perfect weld of the tire to the body is insured and without, as practice has demonstrated, fractures, air-holes, or other defects, if existing about the union of the two members of the composite wheel, calculated to weaken or impair the same for giving a maximum strength and mileage service. The perfect weld is accomplished by pouring the metal to become fused or welded to the tire, with the latter occupying a horizontal position in the mold-box with respect to a plane through a completed wheel, the molten metal entering from the bottom of the box and rising first gradually to about the offset portion $b'$ of the tire, and then more rapidly to the periphery, and all gases escaping through small openings provided in the top of the mold-box, thereby leaving, as practice has fully demonstrated, the tire perfectly welded to the body, without fracture or air-holes therein, and a composite wheel in the shape and condition illustrated in the drawings.

It will be observed that the portion of the body A of the wheel about the middle and to the inner periphery having the greatest thickness of metal, the steel tire portion is made tapering and is of less thickness than near the convex-concave portion of the steel tire about the flange portion thereof, whereby is insured wear of the tire and flange to the extreme limit of safety—for example, as indicated by the dotted line $x$ $x$ in the drawing—being approximately about the union of the tire with the body, with still sufficient steel at the weakest portion of the body to sustain and maintain the strain on the flange portion where greatest to prevent breaking off of the same.

It may be here remarked that the main feature of my present invention is the absolutely perfect weld obtained by the fusing of the one metal to the other to produce the composite wheel of the invention in which is insured maximum strength as well as maximum mileage service, without the danger in extended use of the same of the loss of the flange or cracking thereof

Having thus described the nature and objects of my invention, what I claim as new, and desire to secure by Letters Patent, is—

A car-wheel provided with a steel tire and flange, the inner edge of said tire from the outer side inclined to a convex-concave offset and therefrom oppositely inclined to the inner side, said tire fused or welded to a cast-iron body having a recess complemental to said tire offset and inclined faces or edges complemental to those of said tire, substantially as and for the purposes described.

In testimony whereof I have hereunto set my signature in the presence of two subscribing witnesses.

JAMES W. FULLER.

Witnesses:
J. S. ELVERSON,
A. N. ULRICH.